Aug. 14, 1962  J. S. ALFORD  3,048,971
VARIABLE AREA NOZZLE CONTROL MECHANISM
Filed Dec. 10, 1958  3 Sheets-Sheet 1

INVENTOR.
JOSEPH S. ALFORD
BY
ATTORNEYS

INVENTOR.
JOSEPH S. ALFORD
BY
ATTORNEYS

United States Patent Office 3,048,971
Patented Aug. 14, 1962

3,048,971
VARIABLE AREA NOZZLE CONTROL
MECHANISM
Joseph S. Alford, Cincinnati, Ohio, assignor to the United
States of America as represented by the Secretary of
the Air Force
Filed Dec. 10, 1958, Ser. No. 779,510
5 Claims. (Cl. 60—35.6)

This invention relates to mechanism for varying the area of the nozzle of a thermal power plant. More particularly, the invention is concerned with providing a system whereby the throat area and the final exit area of a convergent-divergent nozzle can be independently controlled. The control has particular utility in connection with ejector-type nozzles when the array of fingers comprising the primary nozzle can be actuated independently of the array of fingers comprising the secondary nozzle.

As is well known, the efficiency and propulsive thrust obtained from an engine having a duct through which a fluid discharges may be controlled under certain conditions, by providing an adjustable nozzle wherein the geometry of the discharge end of the duct is varied. This is particularly important for efficient operation of jet propulsion combustion engines for aircraft because of the different speeds and operating conditions to which the aircraft is necessarily subjected. Many problems are encountered in providing a variable nozzle which can be regulated to provide independent control of the throat and exit areas of the nozzle. Among the factors to be considered before a suitable regulating mechanism can be established is the temperature, speed, and flow characteristics of the gases at the nozzle end of the engine.

Ordinarily ejector type jet nozzles are provided with primary and secondary nozzles which have a fixed schedule of motion between them. As aircraft power plants become more efficient and maximum flight speeds increase, it becomes more and more desirable to provide for independent adjustment of the nozzle in both the throat or primary area and the secondary or final exit area. In the present invention this is accomplished by controlling adjustable flaps or fingers which comprise the primary nozzle separately from the flaps which form the secondary nozzle.

Accordingly, it is an object of the present invention to provide a control system for varying the geometry of a converging-diverging nozzle of a thermal power plant.

Another object of the invention is to provide a nozzle control system for a thermal power plant whereby the primary or throat area of the nozzle and the secondary or final exit area can be controlled independently of each other.

A further object of the invention is to provide a nozzle control system which allows relatively rapid regulatory motion of the flaps comprising the primary nozzle.

A still further object of the invention is to include fingers of sufficient length in making up the secondary nozzle to allow for gradual and smooth curvatures, without requiring the expending of an unusually large amount of power. This is accomplished by keeping the speed of motion of the long secondary fingers as low as practicable.

Other objects, features and advantages of the invention will become more apparent from the following description taken in connection with the illustrative embodiments in the accompanying drawings wherein.

Figure 1:
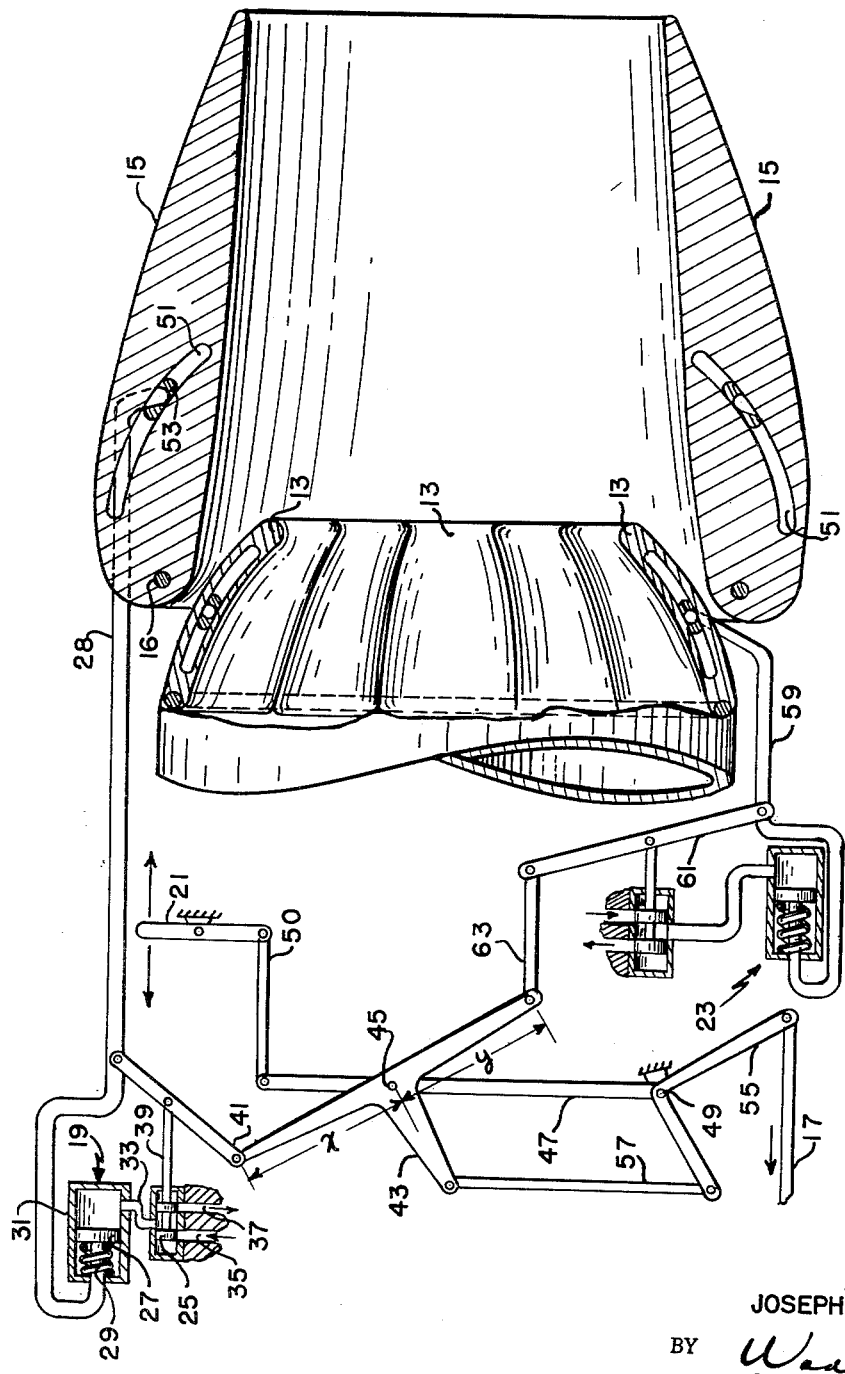
FIG. 1 shows a control arrangement where movement of the nozzle control lever causes motion of both primary and secondary flaps without any feed-back connection.

The nozzle control mechanism of the invention is suitable for use with propulsion power plants that vary considerably in type, design, and application. In the drawings, the mechanical linkages associated with a typical jet reaction type thermal power plant have been shown. The nozzles have been shown only as flaps or fingers and specific construction of the nozzles and remaining portions of the power plant is omitted as not essential to the understanding of the present invention.

Referring now to FIG. 1, there is shown an arrangement that provides for a rate of movement of the primary flaps 13 which is completely independent of the motion of the secondary flaps 15. Similarly, the motion of the secondary flaps 15 does not have any feed-back link relating to the motion of the primary nozzles. However, if the primary nozzle pressure ratio increases, the control link 17 moves in the direction shown by the arrow which increases the opening of the secondary flaps 15 relative to the primary flaps 13.

A servomechanism 19 of the hydraulic type is used to cause the variable area secondary nozzle having the flaps 15 to open or close in accordance with corresponding movement of the control handle 21. A similar servomechanism 23 is employed in conjunction with the primary nozzle flaps 13 and acts to regulate the primary nozzle opening in accordance with the position of the same control handle 21. Since the servomechanisms 19 and 23 are both essentially the same only one will be described in detail.

Now considering element 19, there is shown a pilot valve 25, a spring biased piston 27 having a piston rod 28, and a biasing spring 29. Piston 27 is reciprocally movable in a cylinder 31 and is biased by spring 29 so that the flaps 15 of the secondary nozzle are thereby biased to the open position. Communication is established between cylinder 31 and pilot valve 25 by the provision of fluid passage 33. Hydraulic fluid under pressure is supplied to an inlet passage 35 and is drained from the servomechanism 19 by the exit passage 37. Suitable pumping means, a fluid reservoir, and connecting conduits are required for supplying fluid to passage 35 and for draining fluid from passage 37 but are not essential to an understanding of the invention and, therefore, are not shown.

A rod 39 is suitably secured to one end of the pilot valve 25 and is connected at the other end to a floating lever 41. One end of the floating lever 41 is connected to piston rod 28 and the other end is connected to the linkage member 43. A pivot 45 permits angular movement of member 43 in either direction relative to the member 47 upon which the member 43 is mounted. The lower end of member 47 is supported by the fixed pivot 49. The manual control lever is connected to the member 47 through the link 50.

In the position shown in the drawing, the pilot valve 25 simultaneously interrupts communication between passages 33 and 35 and between 33 and 37. The pilot valve can remain in the position shown only when the pressure force of the hydraulic fluid acting on the right side of the piston 27 is exactly balanced by the force exerted by the biasing spring 29. If member 43 is caused to turn clockwise around pivot 45, pilot valve 25 will momentarily be moved to the right by the corresponding movement of floating lever 41 and rod 39. This establishes communication between passages 33 and 37 and allows fluid to drain from cylinder 31 through the passages 33 and 37 respectively, thus reducing the fluid pressure on the right side of piston 27 and allowing it to be forced to the right by the action of biasing spring 29.

Member 28 is connected to the secondary nozzle flaps 15 which rotate around the pivot 16. A curved slot 51 adapted to receive a follower member 53 is machined in the flap 15. The piston rod 28 is attached to the follower member 53 in such a manner that the two elements can swivel with respect to each other. Thus, it will be apparent that a movement to the right of the piston 27 causes the secondary nozzle flap 15 to open.

When piston 27 has moved to the right an amount directly proportional to the amount of counterclockwise movement of member 43, the pilot valve 25 will have returned to its original position as shown in the drawings. This is so because of the action of lever 41 which is connected to member 43, piston rod 28, and the pilot valve lifting rod 39, thus interrupting the previously established communication between passages 33 and 37. As member 43 continues to move clockwise, pilot valve 25 moves farther to the right and establishes communication between fluid passages 33 and 35 so that pressurized fluid is admitted to cylinder 31, thereby forcing the piston 27 to the left against the action of biasing spring 29 until the movement of the piston rod 28 to the left has restored the pilot valve 25 to its original position by the motion of connecting members 41 and 39 in the manner described above. This arrangement will be recognized as a proportional type of servo mechanism provided with automatic follow-up. That is, rotational movement of the upper end of member 43 will cause a directly proportional movement of piston rod 28 and thus of variable nozzle portions 15.

Still referring to FIG. 1, a bellows control (not shown) acts to move link 17 in the direction of the arrow when the pressure ratio at the primary nozzle increases. The link 17 is connected to the linkage member 43 through the link 55 which rotates about a fixed pivot 49 and link 57. The primary flaps 13 are controlled by the piston rod 59 which is operated by the servomechanism 23. Because of the similarity of construction with element 19 the details of the servomechanism 23 need not be described except to point out the links 61 and 63 which act to connect the piston rod 59 with the common linkage member 43. Since it is desirous to limit the rate of opening of the primary nozzle flaps 13 to the approximate rate of opening of the secondary flaps 15, the x–y ratio of the link 43 is arranged to obtain this desired result.

Figure 2:
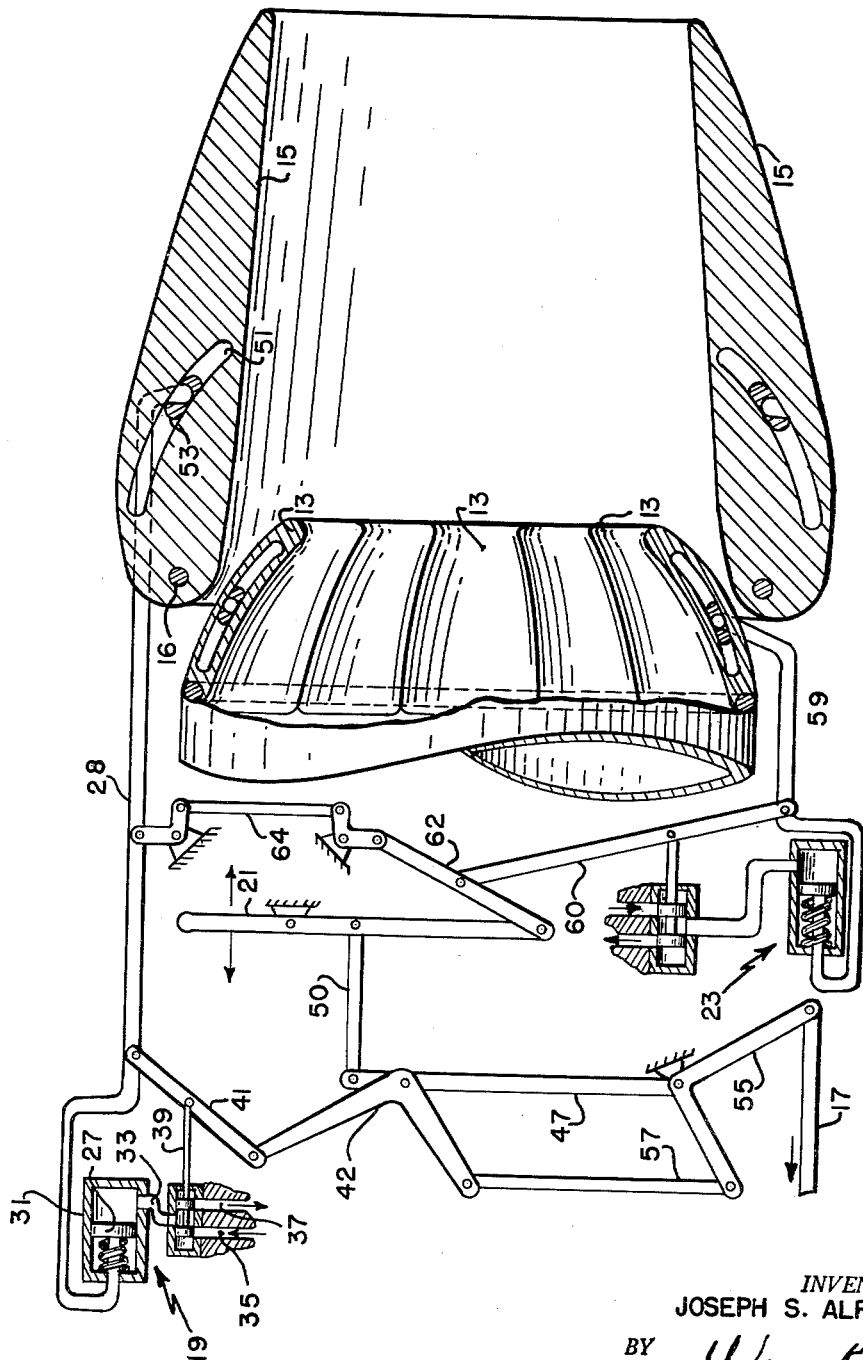
FIG. 2 is a view of a control arrangement wherein the primary nozzle can operate over a limited range of travel without any motion of the slow-moving secondary or outer flaps.

Under certain operating conditions it may be desired to permit the flaps 13 of the primary nozzle to operate over a limited range of travel without any motion of the slow-moving secondary nozzle flaps 15. The mechanism which is capable of operating in this manner is shown in FIG. 2. In this configuration the linkage member 43 is omitted and member 42 is substituted therefor. The piston rods 28 and 59 which operate the secondary and primary nozzle flaps respectively are interconnected to each other through the linkage system including links 60, 62, and 64. The control lever 21 has been modified so that it now connects directly to one end of the link 62. Because of this feed-back linkage, the full motion of the primary nozzle flaps 13 can result only after the outer or secondary nozzle flaps 15 have also responded to the signal.

Figure 3:
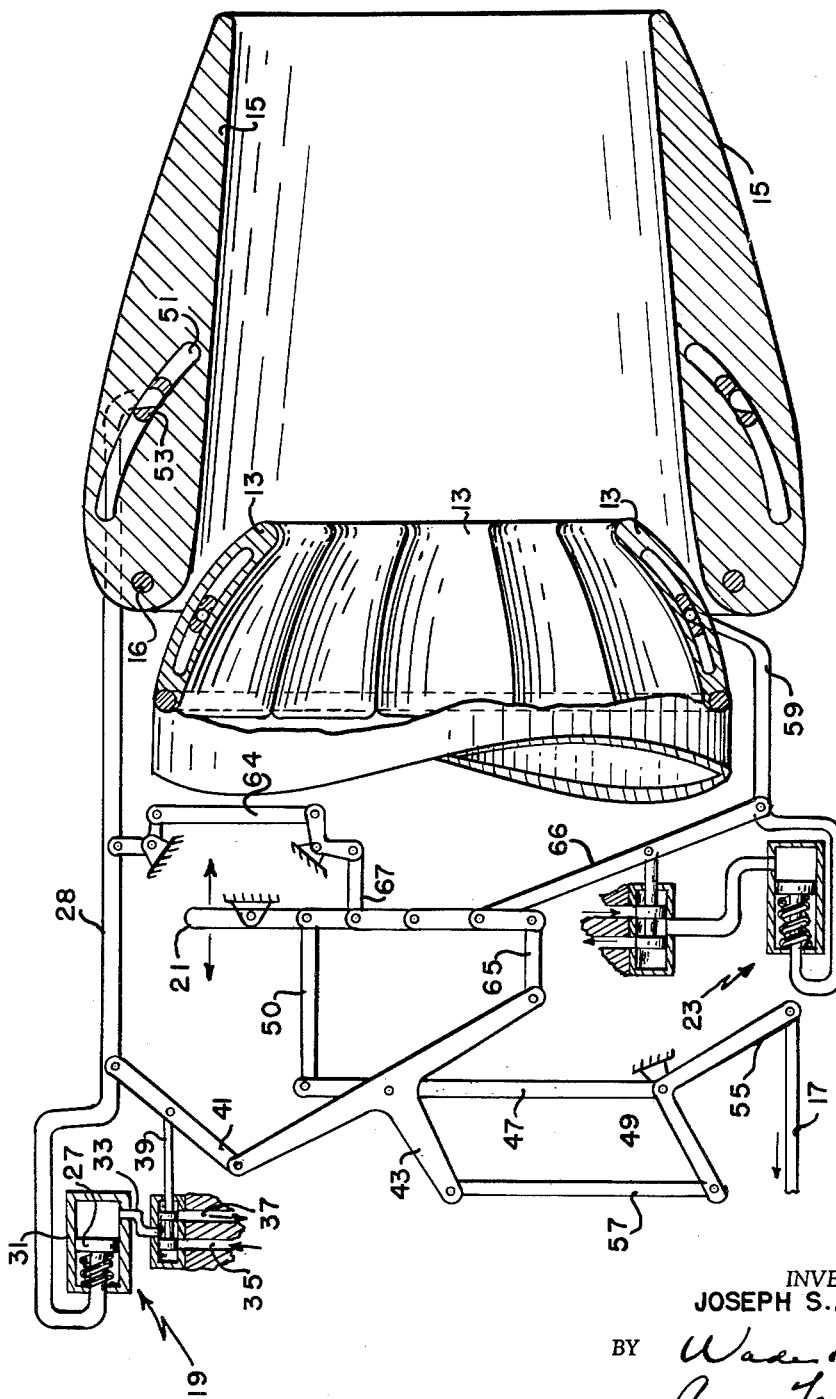
FIG. 3 shows an arrangement which provides for exact matching between the rate of opening of the primary nozzle and that of the secondary nozzle.

Another arrangement for controlling the primary and secondary nozzles is shown in FIG. 3. This configuration provides for exact matching between the rate of opening of the primary nozzle flaps 13 and that of the secondary nozzle flaps 15. The link 66, which compares with the links 60 and 61 in the other configurations, is connected directly to the control lever 21 which in turn is directly connected to one end of the linkage member 43 by the floating link 65. Another floating link 67 connects the linkage including link 64, which is attached to the piston rod 28, to the control lever 21 at a point between the attachment points of links 50 and 66. The introduction of the floating link shown provides that the opening of the primary nozzle flaps 13 can proceed only to the extent that the secondary nozzle flaps 15 have actually moved.

In operation the manual control lever 21 is moved to the left to close and to the right to open. This causes corresponding movement of the primary and secondary nozzle flaps depending on the position of control link 17 and the particular configuration of links which are being employed in FIG. 1, 2, or 3) in the control mechanism.

The invention described herein is particularly useful for gas turbine power plants having reheat systems because the discharge area of the power plant must necessarily be regulated to suit the varying operating conditions. Even where no reheat system is used, the invention is useful to vary the thrust output of the engine without changing the rotational speed thereof. Furthermore, the operating efficiency of a thermal power plant particularly at supersonic speeds, can be greatly improved by providing independently adjustable primary and secondary nozzles. It will be noted that the secondary nozzle flaps 15 are depicted as relatively long in axial length because during subsonic flight in order to obtain a low base drag, gradual and smooth curvature is required.

Having described my invention with reference to certain particular embodiments and arrangements, it is obvious to one skilled in the art that various modifications and variations of these arrangements can be made without departing from the true spirit and scope of the invention. Therefore, it is not intended that the invention be limited to the specific embodiments herein set forth, but to include as well any of the various modifications which can be made therein.

What I claim is:

1. A geometrically variable ejector for controlling the propulsive thrust of an aircraft power plant having an exhaust duct through which spent gases discharge, said ejector comprising a first array of pivotal adjustable flaps which form the primary upstream nozzle thereof and a second array of pivotal adjustable flaps which form the secondary downstream nozzle thereof, said flaps being provided with cam slots therein for receiving camming members, means for independently controlling the relative rate of opening of said primary and secondary outlet portions including a pair of hydraulic servomechanisms each having a piston therein, piston rods attached to each of said pistons and to said camming members disposed in the cam slots of said flaps, lateral movement of said piston rods causing said camming members to slide in said cam slots and pivot said flaps, the pivotal motion of said flaps resulting in a corresponding variation in the shape of the outlet openings, and means including at least one floating linkage member for connecting the piston rod of each hydraulic servomechanism with the pilot valve of the other in such a manner that the array of flaps comprising the primary nozzle operate in a proportionally controlled rate of movement as compared to the movement of the array of flaps comprising the secondary nozzle.

2. A geometrically variable ejector for controlling the propulsive thrust of an aircraft power plant having an exhaust duct through which spent gases discharge, said ejector comprising primary upstream and secondary downstream nozzles, said primary nozzle comprising a first series of pivotally mounted flaps, a first hydraulic servomechanism having a piston with a first rod attached thereto, the other end of said first rod being attached to said primary nozzle, said secondary nozzle being located adjacent the downstream end of said primary nozzle and comprising a second series of pivotally mounted flaps, a second hydraulic servomechanism having a piston with a second rod attached thereto, the other end of said second rod being attached to said secondary nozzle, lateral movement of said piston rods causing said first and second series of flaps to pivot and correspondingly vary the relative configuration of said primary and secondary nozzles, and means including a series of links operatively connecting said first rod to a pilot control valve attached to said second servomechanism and connecting said second rod to a pilot control valve attached to said first servomechanism such that the movement of said first series of flaps comprising said primary nozzle is independent of and correlated to the movement of the second series of flaps comprising said secondary nozzle.

3. A geometrically variable ejector for controlling the effective discharge flow pattern of an aircraft power plant having an exhaust duct through which spent gases discharge, said ejector including a throat area comprising a primary nozzle and a final exit area comprising a secondary nozzle, each of said nozzles being comprised of a plurality of pivotally mounted flaps, said pluralities being independently pivoted, means for controlling the relative rate of opening of said primary and secondary nozzles including a pair of hydraulic servomechanisms each having a piston therein, piston rods attached to said pistons and to said pivotally mounted flaps, lateral movement of said piston rods causing said flaps to pivot so as to correspondingly vary the shape of said nozzles, means including floating linkage members, operatively connecting said piston rods to each other and to the pivotally mounted flaps attached thereto for permitting substantially independent movement of said primary and secondary nozzle flaps, and means responsive to primary nozzle pressure ratio for actuating said control means when the pressure ratio exceeds a predetermined value at which time said control means operates to increase the rate of opening of the flaps which comprise the final exit area.

4. A geometrically variable discharge nozzle for controlling the propulsive thrust pattern of an aircraft power plant having an exhaust duct through which spent gases discharge, said nozzle including a throat area comprising a primary outlet portion and a final exit area comprising a secondary outlet portion, each of said portions being comprised of a plurality of pivotally mounted flaps, said pluralities being independently pivoted, means for controlling the relative rate of opening of said primary and secondary outlet portions including a pair of hydraulic servomechanisms each having a piston therein, piston rods attached to said pistons and to said pivotally mounted flaps, lateral movement of said piston rods causing said flaps to rotate so as to correspondingly vary the slope of said outlet openings, and means, including a feed-back linkage member, operatively connected to said servomechanisms to operate said primary outlet flaps over a limited range without any corresponding motion of said secondary outlet flaps, said last named means allowing full motion of said primary outlet flaps after said secondary outlet flaps have responded to an actuating signal.

5. A geometrically variable discharge nozzle for controlling the propulsive thrust of an aircraft power plant having an exhaust duct through which spent gases discharge, said nozzle having a first array of pivotal adjustable flaps which control the primary upstream outlet portion thereof and a second array of adjustable flaps which control the secondary downstream outlet portion thereof, said flaps being provided with cam slots therein for receiving camming members, means for controlling the relative rate of opening of said primary and secondary outlet portions including a pair of hydraulic servomechanisms each having a piston therein, piston rods attached to said pistons and to the camming members in the cam slots of said flaps, lateral movement of said piston rods causing said camming members to slide in said cam slots and pivot said flaps, the rotary motion of said flaps resulting in a corresponding variation of the shape of the outlet openings, and means, including a floating link, operatively connected to said servomechanisms to prevent the movement of said first array of primary outlet flaps until the second array of secondary outlet flaps has already opened, said last named means also providing for exact matching between the rate of opening of said primary and secondary outlet flaps.

References Cited in the file of this patent

UNITED STATES PATENTS

| | | |
|---|---|---|
| 2,713,767 | Alford et al. | July 26, 1955 |
| 2,840,984 | Laucher | July 1, 1958 |
| 2,846,843 | Clark et al. | Aug. 12, 1958 |
| 2,858,668 | Kelley et al. | Nov. 4, 1958 |
| 2,910,828 | Meyer et al. | Nov. 3, 1959 |
| 2,914,914 | Vandenberg | Dec. 1, 1959 |
| 2,923,127 | Biehl et al. | Feb. 2, 1960 |
| 2,931,169 | Glenn | Apr. 5, 1960 |
| 2,932,163 | Hyde | Apr. 12, 1960 |

OTHER REFERENCES

Grinyer: SAE Transactions, 1958, vol. 66, pp. 318–319.
Pearson: Journal of the Royal Aeronautical Society, vol. 62, No. 573, p. 662, September 1958.